UNITED STATES PATENT OFFICE.

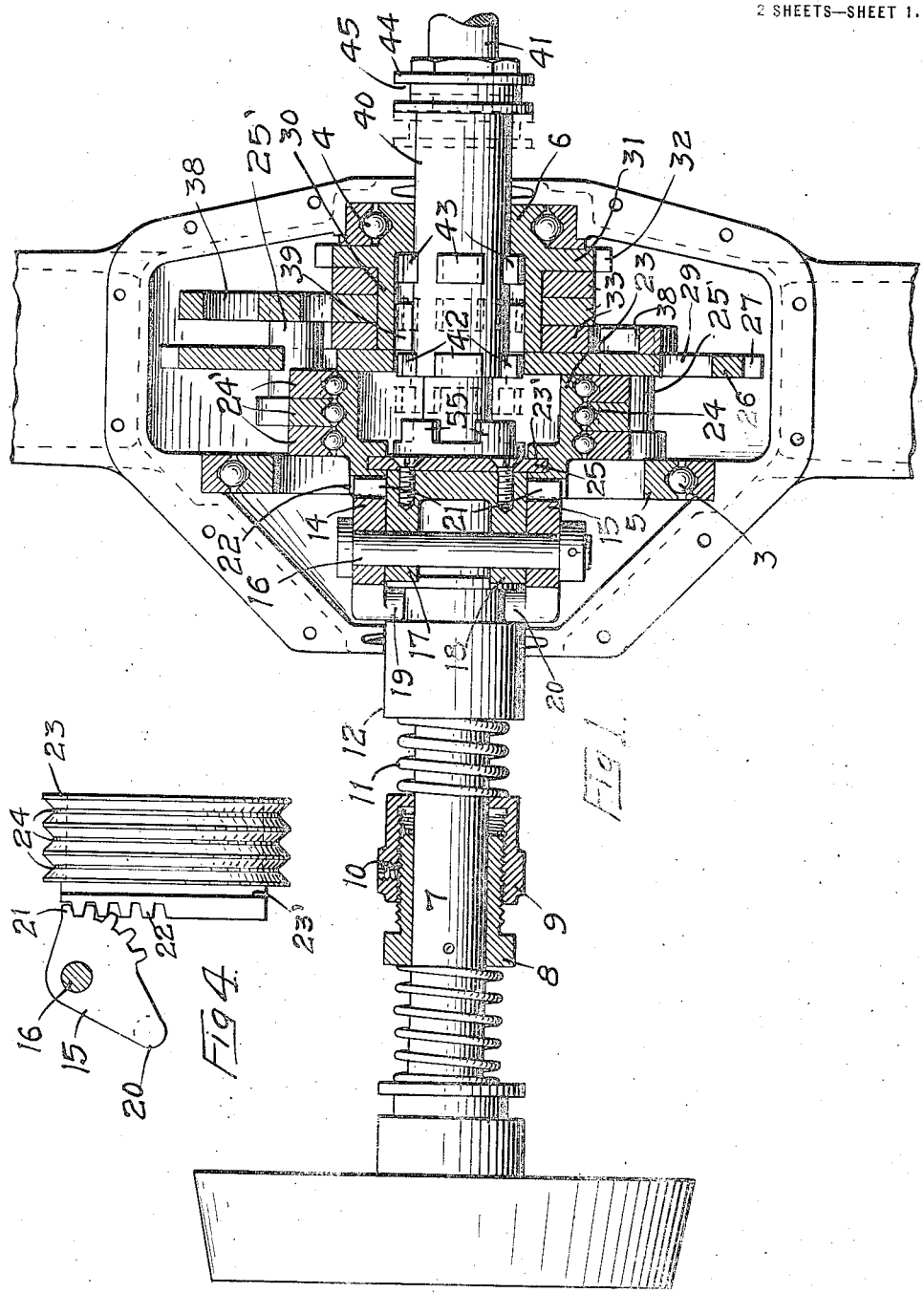

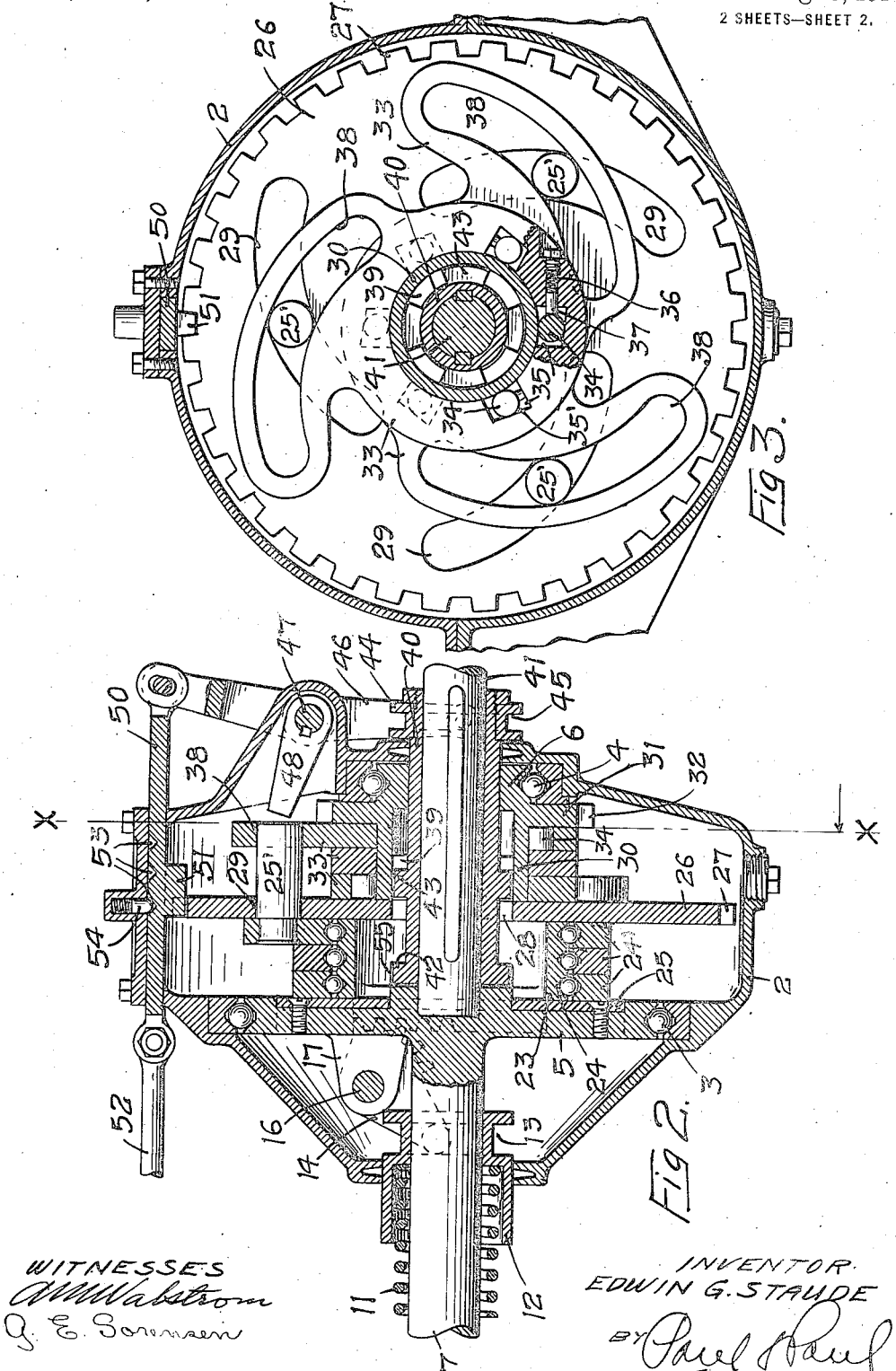

EDWIN GUSTAVE STAUDE, OF MINNEAPOLIS, MINNESOTA, ASSIGNOR TO E. G. STAUDE MANUFACTURING CO., OF MINNEAPOLIS, MINNESOTA, A CORPORATION.

VARIABLE-SPEED GEARING.

1,193,727.

Specification of Letters Patent.   Patented Aug. 8, 1916.

Application filed July 11, 1912.   Serial No. 708,867.

*To all whom it may concern:*

Be it known that I, EDWIN G. STAUDE, of Minneapolis, Hennepin county, Minnesota, have invented certain new and useful Improvements in Variable-Speed Gearing, of which the following is a specification.

The primary object of my invention is to provide a positive, variable speed gearing which will automatically limit the torsional stress of the driving shaft according to the power of the driving member, regardless of the load on the driven member.

A further object of my invention is to provide a gearing which will have a direct drive on high speed.

A further object is to provide a simple and efficient reverse mechanism.

A further object is to provide a construction which will be simple and compact as well as highly efficient in the economical transmission of power.

The invention consists generally in various constructions and combinations, all as hereinafter described and particularly pointed out in the claims.

In the accompanying drawings forming part of this specification, Figure 1 is a horizontal sectional view of the variable speed gearing embodying my invention, Fig. 2 is a vertical section thereof, Fig. 3 is a cross section on the line $x$—$x$ of Fig. 2, Fig. 4 is a detail view of the means for regulating the stroke of the driving eccentric.

In the drawing, 2 represents a suitable housing containing ball races 3 and 4 which furnish bearings for the spider 5 and the sleeve 6.

7 is a driving shaft, formed integral, preferably, with the spider 5 and has mounted upon it a collar 8 with an adjustable nut 9 secured by a headless set screw 10. A spring 11 is mounted on the shaft 7 and bears against the adjustable nut 9 on one end and against a sliding sleeve 12 at the other end. The nut 9 is adjusted against the spring 11 to tension it sufficiently to crowd the sleeve 12 toward the spider 5.

On the inner edge of the sleeve 12 is an annular groove 13. Two sector gears 14 and 15 are mounted on a pin 16 having bearings 17 and 18 cast integral, preferably, with the spider 5. Lugs 19 and 20 are formed on the outer ends of the sector gears 14 and 15 and operate in the groove 13 of the sleeve 12. Teeth 21 are formed on the inner ends of the sectors 14 and 15 and mesh with teeth 22 forming a rack on an eccentric 23. The eccentric 23 is slidably mounted on a plate 25 that is secured to the spider 5 and has its edges fitting within grooves 23' in the eccentric 23.

From the construction so far described it will be noted that the tension of the spring 11 will rock the sector gears and cause the eccentric 23 to be moved out to its most eccentric position and, as will be later described, the increased pressure of the load will move the eccentric to a more concentric position and in this way gain a leverage on the driven member.

The eccentric 23 is provided with three peripheral grooves 24, and each of these grooves has a ball bearing for an eccentric strap 24' having a pin 25'. Adjacent to the third sector strap 24' is a disk 26 having peripheral teeth 27 and a central opening provided with teeth 28 and also having curved tangential slots 29 adapted to receive the pins 25' on the eccentric straps. Near the disk 26 is a hub 30 secured to a disk 31 formed, preferably, on the member 6. The disk 31 has peripheral teeth 32 and mounted on the hub 30 are three ratchet devices 33 provided, preferably, with rollers 34 operating in recesses 35 having inclined surfaces 35'.

The rollers 34 are held in working contact at all times between said inclined surfaces and said hub by means of springs 36 and pins 37 which permit the member 33 to move freely in one direction, but cause it to grip the hub 30 when moved in the opposite direction. The member 33 is provided with curved tangential slots 38 which extend transversely with respect to the slots 29 and are adapted to receive the pins 25' on the eccentric straps 24'. The hub 30 is provided with inwardly projecting lugs 39 which are adapted to coöperate with similar lugs 43 on a sleeve 40 splined to the driven member 41 and having lugs 42 on its inner end. The sleeve 40 has a collar 44 secured to its outer end and provided with an annular groove 45 to receive the inner end of a lever 46. The lever 46 is mounted on a shaft 47 and keyed to the same shaft is a pawl 48. The outer end of the lever 46 is connected to a bar 50 having a lug 51 which coöperates with the teeth 27 of the disk 26, and a rod 52 connects the bar 50 with a suitable operating lever (not shown). The bar 50 is provided with depressions 53 and a spring pressed plug 54 enters the depressions and holds the bar 50 in position and prevents premature movement thereof. The spider 5 is provided with integral lugs 55 which are adapted to coöperate with the lugs 42 on the sleeve 40. When the lugs 42 interlock with the lugs 55 the drive will be direct from the shaft 7 through the sleeve 40 to the driven member 41.

In practice, my gearing operates as follows:—The spring 11, (normally holding the eccentric 23 in its most eccentric position, thereby applying the maximum stroke to the pins 25'), will be compressed when power is applied to the shaft 7, but only to an extent sufficient to start the load on the driven shaft 41. If the load on the driven shaft 41 is so great that the pins 25' cannot move through the slots 29 of the disk 26 and the slots 38 of the member 33, the eccentric 23 will be forced against the tension of the spring 11 to a more concentric position or to a point where the eccentric will have sufficient leverage to overcome the resistance of the driven shaft 41. As soon as the load is started the spring 11, being properly adjusted, will force the maximum stroke on the eccentric as fast as the load on the driven member decreases sufficiently to permit the increase of speed due to the decrease of the torsional stress on the driven member. During this operation the sleeve 40 will be in such position, (see dotted lines in Fig. 1) that the lugs 42 will be out of engagement with the lugs 55 but the lugs 43 will be in engagement with the lugs 39 and the lugs 51 on the bar 50 will prevent the rotation of the disk 26.

As soon as the driven member 41 picks up speed so as to run at about the speed of the driving member 7, a movement of the lever and bar 50 will bring the sleeve 40 into the position shown in Fig. 2, thus interlocking the lugs 42 and 55 and the shafts 7. The lugs 43 will be still in mesh with the lugs 39 but the load will be transmitted, (when the sleeve 40 is in the position shown in Fig. 2) through the lugs 55 and 42 and the device will then become a direct drive. Should, however, the load on the driven member 41 become greater than the power on the shaft 7 can handle, the lever device 52 is moved to such a position that the plug 54 will engage the center notch 53 and in this position the power will be transmitted through the eccentric and the pins 25' to the ratchet device that coöperates with the hub 30 in the manner heretofore described.

In order to reverse the direction of rotation of the shaft 41, the lever device 52 is moved so that the plug 54 will engage the third notch to the right and in this position the lug 51 will have cleared the disk 26 so that it is free to revolve. The lug 42 on the sleeve 40 will be in engagement with the lugs 28 on the disk, (see full lines in Fig. 1) and the lugs 43 will be out of mesh with the lugs 39 and at the same time the pawl 48 will engage the teeth 32 and prevent the hub 30 from revolving and lock the ratchet devices 33 against movement in one direction and consequently cause the disk 26 to be moved in the other direction, and, as said disk is connected to the sleeve 40 by the lugs 28 and 42, said sleeve and shaft 41 will be forced in the opposite direction. The eccentric 23 with the strap 24 and the pins 25 operate under the control of the spring 11 in the same manner as described for the forward movement of the shaft 41.

I claim as my invention:—

1. A variable speed gearing comprising a driving shaft, a driven shaft, independent disks having curved tangential slots therein and a driving connection with said driven shaft, pins fitting within said slots and operatively connected with said driving shaft, and means for forcing said pins in said slots toward said driven shaft to increase their leverage thereon proportionately to the increase of the load on said driven shaft.

2. A variable speed gearing comprising a driving shaft, a driven shaft, independent disks having a clutch connection with said driven shaft, a power transmitting mechanism interposed between said disks and said driving shaft and operating to increase the leverage on said disks and driven shaft proportionately to the increase of the load on said driven shaft.

3. A variable speed gearing comprising a driving member, a driven member concentric therewith, an eccentric having a radial movement with respect to said members and interposed between them, means connecting said eccentric with said driving member and means connecting it with said driven member, said driving member connecting means operating to increase the degree of eccentricity of said eccentric and vary the leverage on said driven member proportionately to the load thereon.

4. A variable speed gearing comprising a driving member, a driven member, an eccentric radially movable with respect to said members, sector gears having driving connections with said driving member and with said eccentric, and means operatively connecting said eccentric with said driven member, said eccentric moving radially and adjusting itself automatically to increase or decrease the leverage on said driven member.

5. A variable speed gearing comprising a driving shaft, a driven shaft coaxial therewith, an eccentric interposed between said shafts and radially movable with respect thereto, a spring for normally holding said eccentric at the limit of its eccentric position, means operatively connecting said eccentric with said driven shaft, said means including slotted disks and pins slidable therein and operated from said eccentric, said disks having clutch connections with said driven shaft and the leverage thereof increasing in proportion to the increase of load on said driven shaft.

6. A variable speed gearing comprising a driving shaft having a disk thereon, a driven shaft, an eccentric having a radial movement with respect to said shafts, means operatively connecting said eccentric with said driving shaft for moving said eccentric radially to compensate for the decreasing load on said driven shaft, and means connecting said eccentric with said driven shaft and including disks having clutch connections with said driven shaft and operatively connected with said eccentric.

7. A variable speed gearing comprising a driving shaft, a driven shaft, an eccentric operatively connected with said driving shaft and having a radial movement with respect thereto, eccentric straps encircling said eccentric and having bearings thereon and means operatively connecting said eccentric straps with said driving shaft, said means forcing said eccentric straps and eccentric outwardly to decrease the leverage on said driven shaft proportionately to the load thereon.

8. A variable speed gearing comprising a driving shaft, a driven shaft, a radially movable eccentric operatively connected with said driving shaft, eccentric straps encircling said eccentric and having bearings thereon, pins mounted in said straps, independent disks having curved tangential slots to receive said pins respectively, a driving connection with said driven shaft, and means for forcing said pins in said slots toward said driven shaft and decreasing the eccentricity of said eccentric and increasing its leverage on said driven shaft proportionately to the increase of the load on said driven shaft.

9. A variable speed gearing comprising a driving shaft, an eccentric having a radial movement with respect to said shaft and operatively connected therewith, eccentric straps for said eccentric, pins mounted in said eccentric straps, a normally stationary disk having curved slots therein to receive said pins, the walls of said slots engaging said pins and causing the movement of said eccentric to a more concentric position as the load on said pins increases, and means operatively connecting said pins with said driven shaft.

10. A variable speed gearing comprising a driving shaft, a driven shaft, an eccentric having a limited radial movement and operatively connected with said driving shaft, straps for said eccentric, pins mounted in said straps, a normally stationary disk having curved slots therein to receive said pins, disks having ratchet connections with said driven shaft and also provided with curved slots extending transversely therein with respect to the slots of said normally stationary disk and adapted to receive said pins, said pins moving in the slots of said disks to force said eccentric inwardly and increase the leverage thereof on said driven shaft in proportion to the load on said driven shaft.

11. A variable speed gearing comprising a driving shaft, a driven shaft, a radially movable eccentric, eccentric straps therefor, a disk having curved slots therein, pins mounted in said straps respectively and adapted to enter said slots, means for normally locking said disk, mechanism connecting said pins with said driven shaft, said eccentric and straps moving radially to increase or decrease the leverage of said eccentric on said driven shaft, and means for locking said mechanism and releasing said disk, the locking of said mechanism causing the release of said disk, and means connecting said disk with said driven member to reverse its direction of rotation.

12. A variable speed gearing comprising a driving shaft, a driven shaft, a loosely mounted hub having a driving connection with said driven shaft, means for locking said hub against rotation, a normally stationary disk having curved slots therein and means for normally locking said disk, means for actuating said locking means to release said disk and simultaneously lock said hub, and mechanism operatively connecting said driving shaft with said hub through the slots in said disk for reversing the direction of rotation of said driven member.

13. A variable speed gearing comprising a driving shaft, a driven shaft, a sleeve splined on said driven shaft and having a clutch connection with said driving shaft for a direct drive, an indirect drive mechanism for connection with said driving shaft and said driven shaft, said indirect mechanism including a radially moving eccentric and straps therefor operatively connected with said driving shaft to decrease the leverage on said driven shaft proportionately to the load thereon.

14. A variable speed gearing comprising a driving shaft, a driven shaft, a sleeve splined on said driven shaft and having a clutch connection with said driving shaft for a direct drive, a hub loosely mounted on said sleeve and having inwardly projecting lugs adapted to mesh with outwardly projecting lugs on said sleeve, a radially movable eccentric operatively connected with said driving shaft, and mechanism connecting said eccentric with said hub and operating to automatically increase the leverage of said eccentric on said hub proportionately to the increase of the load on said driven shaft.

15. A variable speed gearing comprising a driving shaft, a driven shaft, independent members having a driving connection with said driven shaft, a power transmitting mechanism interposed between said members and said driving shaft and operating to decrease the leverage on said members and driven shaft proportionately to the increase of the load on said driven shaft.

In witness whereof, I have hereunto set my hand this 5th day of July, 1912.

EDWIN GUSTAVE STAUDE.

Witnesses:
GENEVIEVE E. SORENSEN,
EDWARD A. PAUL.